H. B. LECKENBY.
Wheels for Vehicles.
No. 150,586.
Patented May 5, 1874.
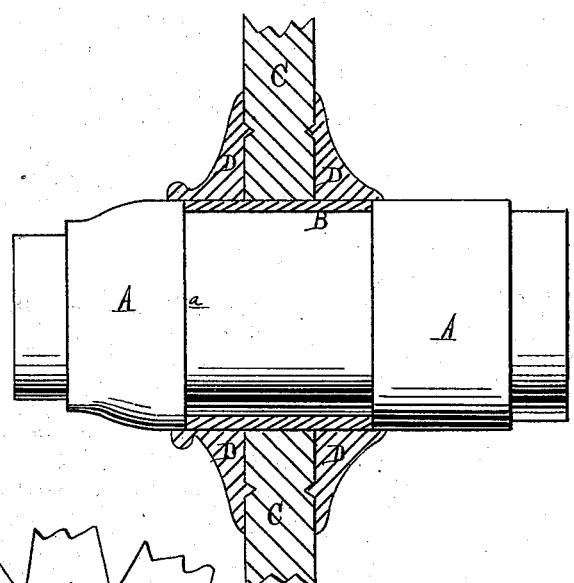
Fig. 1.
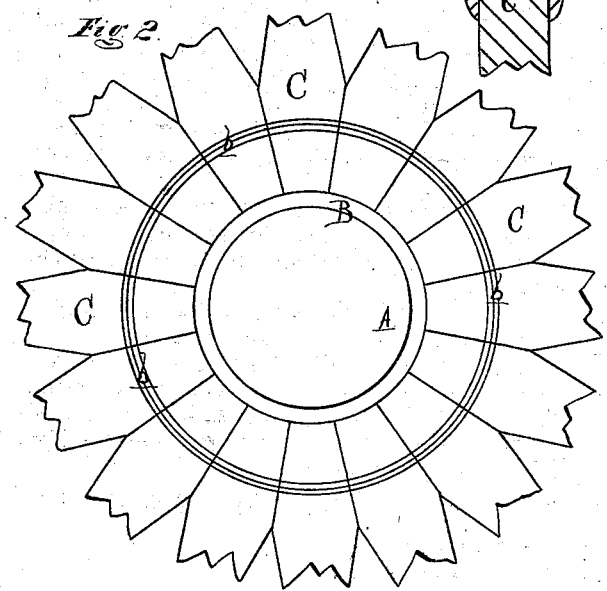
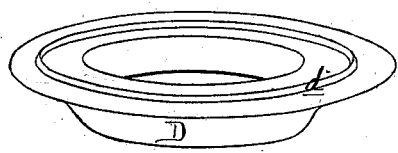
Fig. 3.
ATTEST.
H. Sprague.
Theo. S. Day.
INVENTOR.
H B Leckenby
per Attorney.
Tho. S. Sprague

UNITED STATES PATENT OFFICE.

HARMON B. LECKENBY, OF KALAMAZOO, MICHIGAN.

IMPROVEMENT IN WHEELS FOR VEHICLES.

Specification forming part of Letters Patent No. 150,586, dated May 5, 1874; application filed August 11, 1873.

*To all whom it may concern:*

Be it known that I, HARMON B. LECKENBY, of Kalamazoo, in the county of Kalamazoo and State of Michigan, have invented an Improvement in Wheels for Vehicles, of which the following is a specification:

The nature of this invention relates to certain improvements in the construction of wheels for vehicles; and its object is to improve the invention for a similar purpose as secured to me on the 4th day of February, 1873, by Letters Patent.

Figure 1 is a vertical longitudinal section through the hub. Fig. 2 is an elevation in section with the holding-rings removed. Fig. 3 is a perspective of one of the holding-rings.

Referring to the drawings, A represents a wooden hub, provided with a channeled recess, $a$, sufficiently wide and deep to receive the bearing-band B and leave the outer face thereof flush with the periphery of the hub. This band is made in two sections, each going half-way round the hub within said recess, and the ends of the spokes C are designed to rest against this band, which is made of metal. The inner ends of these spokes are of the general form shown in Fig. 2. A V-shaped groove, $b$, is cut in each of the outer sides of these spokes, at the same distance from their inner ends, so that when the spokes are all in place these grooves will form a continuous circular groove, as shown in Fig. 2. D are support and holding rings, one being provided for each side of the spokes, and the inner face of each one is provided with a V-shaped flange or projection, $d$, which, when the rings are in place, is designed to fit into the similarly-shaped groove $b$ in the spokes, thereby preventing the spokes from drawing out.

These rings may be secured in place by the means described in my Letters Patent, No. 135,434, dated February 4, 1873, or by any other convenient means. Preferably, I would make the outer edge of the hole in the rings a trifle larger, and, the band B being of malleable metal, I would upset the ends thereof, and secure the rings as though they were riveted to place.

A wheel thus constructed may be very light in the hub, while the spokes are held firmly in place, making a strong, light, and durable wheel.

What I claim as my invention, and desire to secure by Letters Patent, is—

In combination with the hub A, having recess $a$, the holding-rings D, having projections $d$, the spokes C, having grooves $b$, and sectional bearing-band B, substantially as described, for the purposes set forth.

HARMON B. LECKENBY.

Witnesses:
 THOS. S. SPRAGUE,
 H. S. SPRAGUE.